United States Patent [19]

Meixner et al.

[11] Patent Number: 5,247,048

[45] Date of Patent: Sep. 21, 1993

[54] ALIPHATIC POLYURETHANES CONTAINING ACRYLOYL GROUPS AND A PROCESS FOR THEIR PRODUCTION

[75] Inventors: Jürgen Meixner, Krefeld; Wolfgang Fischer, Meerbusch, both of Fed. Rep. of Germany

[73] Assignee: Bayer Aktiengesellschaft, Leverkusen, Fed. Rep. of Germany

[21] Appl. No.: 988,645

[22] Filed: Dec. 10, 1992

[30] Foreign Application Priority Data

Dec. 18, 1991 [DE] Fed. Rep. of Germany ....... 4141720

[51] Int. Cl.$^5$ ..................... C08G 18/67; C08G 18/73; C08F 2/46; C08J 3/28
[52] U.S. Cl. ..................................... 528/49; 528/67; 528/75; 528/76; 528/77; 528/80; 528/81; 528/83; 528/85; 522/90; 522/97; 522/173; 522/178
[58] Field of Search ................. 528/49, 67, 75, 76, 528/77, 80, 83, 81, 85; 522/90, 97, 173, 178

[56] References Cited

U.S. PATENT DOCUMENTS

| | | | |
|---|---|---|---|
| 3,782,961 | 1/1974 | Takahashi et al. | 522/96 |
| 4,225,695 | 9/1980 | Schuster et al. | 528/75 |
| 5,128,432 | 7/1992 | Meixner et al. | 528/49 |
| 5,136,008 | 8/1992 | Meixner et al. | 528/49 |
| 5,136,009 | 8/1992 | Meixner et al. | 528/49 |

FOREIGN PATENT DOCUMENTS

| | | |
|---|---|---|
| 1159551 | 7/1969 | United Kingdom . |
| 1159552 | 7/1969 | United Kingdom . |

*Primary Examiner*—Maurice J. Welsh
*Assistant Examiner*—Rabon Sergent
*Attorney, Agent, or Firm*—Joseph C. Gil; Thomas W. Roy

[57] ABSTRACT

The present invention relates to a process for the production of a polyurethane containing acryloyl groups by I) reacting at an NCO:OH equivalent ratio of 1.8:1 to 2.5:1, based on starting components a) and b),
  a) 0.25 to 0.5 moles of a diisocyanate component comprising one or more organic diisocyanates other than hexamethylene diisocyanate which have a molecular weight below 300 and contain aliphatically and/or cycloaliphatically bound isocyanate groups with
  b) 0.2 to 0.55 moles of an alcohol component containing acryloyl groups and comprising one or more monohydric alcohols containing acryloyl groups and having a molecular weight of 116 to 144

II) mixing the product of step I) with
  c) 0.5 to 0.75 moles of hexamethylene diisocyanate, III) reacting the resulting mixture with
  d) 0.1 to 0.65 moles of an alcohol component containing acryloyl groups and comprising one or more monohydric alcohols containing acryloyl groups and having a molecular weight of 116 to 144 and
  e) 0.15 to 0.45 moles of one or more branched monohydric or dihydric alcohols which have a molecular weight of 132 to 2000 and may contain ether and/or ester groups, wherein components d) and e) may be added in any order or in admixture and IV) reacting the product from step III with
  f) 0.1 to 1.2 moles of one or more at least trihydric alcohols having a molecular weight of 92 to 2000,
  wherein the NCO:OH equivalent ratio, based on all of the starting components a) to f), is 0.7:1 to 1:1.

4 Claims, No Drawings

5,247,048

ALIPHATIC POLYURETHANES CONTAINING ACRYLOYL GROUPS AND A PROCESS FOR THEIR PRODUCTION

BACKGROUND OF THE INVENTION

1. Field of the Invention

This invention relates to polyurethanes containing acryloyl groups which may be converted into crosslinked products by radiation curing and to a process for their production.

2. Description of the Prior Art

Polyurethanes containing acryloyl groups which are obtained as a reaction product of inter alia polyisocyanates and hydroxyalkyl acrylates, as described for example in DE-OS 1,644,798, DE-OS 2,115,373 or DE-OS 2,737,406, are known. They are cured by high-energy radiation, such as UV radiation or electron beams, and are used, for example, for coating wood or for the production of coatings for graphic purposes.

Various polyisocyanates may be used for the production of the urethane acrylates. If the production of non-yellowing paint films is an objective, (cyclo)aliphatic polyisocyanates are used for the production of the urethane acrylates. Although hexamethylene diisocyanate is also mentioned as a suitable starting diisocyanate in DE-OS 2,115,373, it is clear that this is a purely hypothetical disclosure because it has never been possible to use this inexpensive diisocyanate due to the crystallinity of the urethane acrylates formed which is a disadvantage to their use as binders for coating compositions.

One of Applicants' earlier patent applications (German patent application P 40 27 743.7, U.S. Pat. No. 5,128,432) describes ester alcohol-modified urethane acrylates based on hexamethylene diisocyanate which are liquid at room temperature after their production.

An object of the present invention is to provide another method of obtaining aliphatic polyurethanes containing acryloyl groups using hexamethylene diisocyanate (HDI) as the primary starting diisocyanate which are liquid, even at temperatures of 0° C., and crosslink rapidly under UV irradiation.

This object may be achieved in accordance with the process according to the invention for the production of aliphatic polyurethanes containing acryloyl groups which is described in detail hereinafter.

SUMMARY OF THE INVENTION

The present invention relates to a process for the production of a polyurethane containing acryloyl groups by I) reacting at an NCO:OH equivalent ratio of 1.8:1 to 2.5:1, based on starting components a) and b),
  a) 0.25 to 0.5 moles of a diisocyanate component comprising one or more organic diisocyanates other than hexamethylene diisocyanate which have a molecular weight below 300 and contain aliphatically and/or cycloaliphatically bound isocyanate groups with
  b) 0.2 to 0.55 moles of an alcohol component containing acryloyl groups and comprising one or more monohydric alcohols containing acryloyl groups and having a molecular weight of 116 to 144
II) mixing the product of step I) with
  c) 0.5 to 0.75 moles of hexamethylene diisocyanate,
III) reacting the resulting mixture with
  d) 0.1 to 0.65 moles of an alcohol component containing acryloyl groups and comprising one or more monohydric alcohols containing acryloyl groups and having a molecular weight of 116 to 144 and
  e) 0.15 to 0.45 moles of one or more branched monohydric or dihydric alcohols which have a molecular weight of 132 to 2000 and may contain ether and/or ester groups,
  wherein components d) and e) may be added in any order or in admixture and
IV) reacting the product from step III with
  f) 0.1 to 1.2 moles of one or more at least trihydric alcohols having a molecular weight of 92 to 2000,
  wherein the NCO:OH equivalent ratio, based on all of the starting components a) to f), is 0.7:1 to 1:1.

The present invention is also directed to the products obtained from this process.

DETAILED DESCRIPTION OF THE INVENTION

Polyisocyanate component a) is selected from organic diisocyanates containing (cyclo)aliphatically bound isocyanate groups and having a molecular weight below 300, except hexamethylene diisocyanate. Suitable diisocyanates include 1-isocyanato-3,3,5-trimethyl-5-isocyanatomethyl cyclohexane (IPDI), 1,6-diisocyanato-2,2,4-trimethyl hexane, 1,4-diisocyanatocyclohexane, 1-methyl-1-isocyanato-3(4)-isocyanatomethyl cyclohexane or mixtures of these diisocyanates.

Components b) and d) are monohydric alcohols containing acryloyl groups or mixtures of these alcohols. Preferred examples include esters of acrylic acid with dihydric alcohols containing one free hydroxyl group. The esters have a molecular weight of 116 to 144. Examples of these ethylenically unsaturated esters include hydroxyethyl acrylate, 1-methyl-2-hydroxyethyl acrylate, 2- and 3-hydroxypropyl acrylate and 2-, 3- and 4-hydroxybutyl acrylate.

Component c) is hexamethylene diisocyanate.

Component e) is selected from branched monohydric and dihydric alcohols which have a molecular weight of 132 to 2000, preferably 132 to 1000, and may contain ether and/or ester groups. Examples of these alcohols include 2,2-diethylpropane1,3-diol, 2-ethylhexane-1,3-diol, 2,5-dimethylhexane-2,5-diol, 2,2,4-trimethylpentane-1,3-diol and the reaction product of 1 mole of trimethylol propane and 1 mole of formaldehyde (trimethylol propane formal).

Component e) may also be selected from ester mixtures having an average hydroxyl functionality of 0.8 to 1.5 which may be obtained, for example, by the reaction of acetic acid or acrylic acid with 1) at least trihydric alcohols, such as trimethylol propane or glycerol or 2) alkoxylation products of such polyhydric alcohols. A preferred example of these alkoxylation products is the adduct of 4 moles of ethylene oxide with 1 mole of trimethylol propane. During the preparation of the ester mixtures, an equivalent ratio of carboxyl groups to hydroxyl groups of 1.5:3 to 2.2:3, preferably 2:3 is maintained. An equivalent quantity of an anhydride may also be used in place of all or a portion of the free acid during the reaction.

The polyols f) include at least trihydric alcohols having a molecular weight of 92 to 2000, such as glycerol, trimethylol propane, pentaerythritol and/or sorbitol. Also suitable are polyether polyols which may be obtained by the alkoxylation of these monomeric alcohols and which have molecular weights of up to 2000, preferably up to 1000. Also suitable are polyester polyols having a molecular weight of up to 2000, preferably up to 1000, which may be obtained by the reaction of polyhydric alcohols and acids or anhydrides of polybasic acids by known methods and which meet the previously disclosed requirements regarding hydroxyl functionality.

The production of the polyurethanes by reaction of the starting components mentioned may be carried out in bulk or in isocyanate-inert solvents, such as acetone, ethyl acetate, butyl acetate, low molecular weight esters of (meth)acrylic acids and mixtures of such solvents. Reaction temperatures of preferably 20° to 100° C., more preferably 40° to 80° C., are maintained during all stages of the reaction. The amounts of the reactants are selected to provide an NCO:OH equivalent ratio of 0.8:1 to 1:1, based on all of the starting components a) to f).

In accordance with the present invention, measures are generally taken to ensure that the reactions of the individual stages are essentially complete before the other reactants are added. This means that the reaction between components a) and b) is carried out at temperatures within the ranges mentioned above until the heat effect of the exothermic reaction has abated before the reaction with components c) to e) is carried out. In the same way the reaction with components c) to e) is essentially complete, as also reflected in the disappearance of the heat effect, before component f) is added.

The reactions are preferably carried out in the presence of suitable catalysts, e.g., tin(II) octoate, dibutyl tin dilaurate or tertiary amines such as dimethylbenzyl amine.

Products having an NCO content below 0.1% by weight are obtained in the final stage of the reaction.

The urethane acrylate obtained as the end product may be protected against premature and unwanted polymerization by the addition of suitable inhibitors and antioxidants, such as phenols and hydroquinones, in quantities of 0.001 to 0.3% by weight. A suitable inhibitor is, for example, the phenothiazine used in the examples. This inhibitor may be added before, during and/or after the process according to the invention.

The coating compositions produced using the products according to the invention may also contain the known auxiliaries and additives from coatings technology. These include fillers, pigments, dyes, thixotropic agents, levelling agents, matting agents and flow control agents which may be used in conventional amounts.

The polyurethanes containing acryloyl groups may also be dissolved in known solvents, mixed with copolymerizable monomers or emulsified in water. Suitable solvents include butyl acetate, cyclohexane, acetone, toluene or mixtures of such solvents.

Examples of suitable copolymerizable monomers include organic compounds which contain at least one copolymerizable olefinic double bond per molecule and which have a viscosity of at most 500 mPa.s at 23° C. Examples of these monomers include styrene, hexane-1,6-diol diacrylate, trimethylol propane triacrylate and N-vinyl pyrrolidone.

The inert solvents and also the copolymerizable monomers may be used in quantities of up to 100% by weight, preferably up to 50% by weight, based on the weight of the polyurethanes containing acryloyl groups. Mixtures of the inert solvents and copolymerizable monomers may also be used.

If the polyurethane containing acryloyl groups is to be processed from an aqueous emulsion, these emulsions may be produced, for example, using external emulsifiers and, optionally, the known auxiliaries used in the emulsion field. Emulsifiers suitable for this purpose are known and are described, for example, in Ullmanns Encyclopädie der technischen Chemie, Vol. 10, 4th Edition, Chapter entitled "Emulsionen (Emulsions)", pages 449 et seq. Preferred emulsifiers are copolymerizable polyurethane emulsifiers containing acryloyl groups of the type described in DE-OS 3,900,257.

The aqueous emulsions generally contain 10 to 70% by weight, preferably 30 to 70% by weight, of the polyurethanes according to the invention containing acryloyl groups. The emulsions may be prepared by stirring water into a mixture of emulsifier and the polyurethane acrylate according to the invention, for example by simple stirring or by means of a dissolver.

In order to form a fine-particle emulsion, i.e., to facilitate the application of shear forces, it is advantageous to add water in portions at temperatures below 30° C. Given optimum shearing conditions, oil-in-water emulsions are formed.

In all variants of the use according to the invention, curing is carried out with high-energy radiation, such as UV light, electron beams or gamma rays, optionally after evaporation of volatile auxiliaries, such as inert solvents or water.

When crosslinking is carried out by UV irradiation, photoinitiators have to be added to the coating compositions. Suitable photoinitiators are known and described, for example, in Houben-Weyl, Methoden der organischen Chemie, Vol. E 20, pages 80 et seq., Georg Thieme Verlag, Stuttgart 1987.

Examples of suitable photoinitiators include benzoin ethers such as benzoin isopropyl ether, benzil ketals such as benzil dimethyl ketal, and hydroxyalkyl phenones such as 2-hydroxy-2-methyl-1-phenyl-1-propan-1-one.

The photoinitiators are used in quantities of 0.1 to 10% by weight, preferably 0.1 to 5% by weight, based on the weight of the products according to the invention. Depending upon the purpose for which the products according to the invention are intended, the photoinitiators may be used individually or, to obtain advantageous synergistic effects, as mixtures.

The coating compositions containing the products according to the invention as binders are suitable for coating various substrates including paper, paperboard articles, leather, wood, plastics, nonwovens, textiles, ceramic materials, mineral materials, glass, metal, artificial leather and photographic materials such as paper provided with a photographic layer.

The invention is illustrated by the following examples in which all parts and percentages are by weight unless otherwise indicated.

EXAMPLES

EXAMPLES 1 TO 6 (INVENTION)

The quantity of component a) set forth in Table 1 was dissolved in butyl acetate (in an amount sufficient to provide a solids content of 80% after production) together with 0.02% dibutyl dilaurate and 0.01% phenothiazine and the resulting solution was heated to 50° C. while air was passed through. The quantity of component b) set forth in Table 1 was then added dropwise with stirring and a maximum reaction temperature of 60° C. was maintained by cooling until formation of the reaction product of a) and b) was essentially complete, as reflected by the abatement of the heat effect. The quantity of component c) set forth in the Table was then added and the quantities of components d) and e) set forth in the Table were successively added dropwise to the mixture with stirring. A maximum reaction temperature of 60° C. was maintained by cooling. Finally, after the heat effect had abated, component f) was added dropwise with stirring and the reaction was continued at 60° C. until the NCO content of the reaction mixture had fallen below 0.1%.

EXAMPLES 7 TO 9 (COMPARISON)

Comparison Examples 7 to 9, which are also summarized in the following Table, were carried out in the same way as Examples 1 to 6 according to the invention.

In Comparison Examples 7 and 8, components e) and a) were used in quantities which do not correspond to the invention. Comparison Example 9 demonstrates that the use of unbranched alcohols as component e) leads to crystalline end products.

10 βm), the coatings were moved beneath a Hanovia lamp (80 W/cm, distance 10 cm). Solvent-resistant and scratch-resistant coatings were formed at a belt speed of at least 10 m/minute.

"Solvent-resistant" means that, after at least 20 double rubs with a cloth impregnated with butyl acetate, the appearance of the coating was still satisfactory in appearance.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a polyurethane containing acryloyl groups which comprises I) reacting at an NCO:OH equivalent ratio of 1.8:1 to 2.5:1, based on starting components a) and b),
   a) 0.25 to 0.5 moles of a diisocyanate component comprising one or more organic diisocyanates other than hexamethylene diisocyanate which have a molecular weight below 300 and contain

|  | Examples |  |  |  |  |  | Comparison Examples |  |  |
|---|---|---|---|---|---|---|---|---|---|
|  | 1 | 2 | 3 | 4 | 5 | 6 | 7 | 8 | 9 |
| Quantity in moles |  |  |  |  |  |  |  |  |  |
| Component a) | 0.3 | 0.3 | 0.3 | 0.3 | 0.3 | 0.3 | 0.3 | 0.2 | 0.3 |
| Isophorone diisocyanate |  |  |  |  |  |  |  |  |  |
| Component b) | 0.3 | 0.3 | 0.3 | 0.3 | 0.3 | 0.3 | 0.3 | 0.2 | 0.3 |
| Hydroxyethyl acrylate |  |  |  |  |  |  |  |  |  |
| Component c) | 0.7 | 0.7 | 0.7 | 0.7 | 0.7 | 0.7 | 0.7 | 0.8 | 0.7 |
| Hexamethylene diisocyanate |  |  |  |  |  |  |  |  |  |
| Component d) | 0.5 | 0.4 | 0.4 | 0.4 | 0.5 | 0.4 | 0.6 | 0.6 | 0.5 |
| Hydroxyethyl acrylate |  |  |  |  |  |  |  |  |  |
| Component e) |  |  |  |  |  |  |  |  |  |
| Trimethylol propane formal | 0.2 |  |  |  | 0.3 |  | 0.1 | 0.2 |  |
| Triemthylol propane diiso-octanoate |  | 0.3 |  |  |  |  |  |  |  |
| 2-Ethylhexane-1,3-diol |  |  | 0.2 |  |  |  |  |  |  |
| 2,2,4-Trimethylpentane-1,3-diol |  |  |  | 0.2 |  |  |  |  |  |
| 2,2-Diethylpropane-1,3-diol |  |  |  |  |  | 0.2 |  |  |  |
| Benzyl alcohol |  |  |  |  |  |  |  |  | 0.2 |
| Component f) |  |  |  |  |  |  |  |  |  |
| Trimethylol propane | 0.33 | 0.33 | 0.3 | 0.3 | 0.27 |  | 0.33 | 0.33 | 0.33 |
| 4x Ethoxylated trimethylol propane |  |  |  |  |  |  |  |  |  |
| Appearance at 0° C.: | clear liq. | clear liq. | clear liq. | clear liq. | clear liq. | clear liq. | Cryst. | Cryst. | Cryst. |

COMPARISON EXAMPLE 10

Example 1 was repeated with the exception that components a) and c) were introduced first and components b) and d) were then added together. The product formed crystallized out at 5° C.

COMPARISON EXAMPLE II

Example 1 was repeated with the exception that component c) was introduced first followed by component d), after which components a) and b) were successively added. The product formed again crystallized out at 5° C.

APPLICATION EXAMPLES

The products of Examples 1 to 6 were adjusted with n-butyl acetate to a processing viscosity of approx. 50 seconds (DIN 4 mm cup, 23° C). 5% benzophenone (based on 100% urethane acrylate) was then added. After application to paperboard (in a layer thickness of aliphatically and/or cycloaliphatically bound isocyanate groups with
   b) 0.2 to 0.55 moles of an alcohol component containing acryloyl groups and comprising one or more monohydric alcohols containing acryloyl groups and having a molecular weight of 116 to 144

II) mixing the product of step I) with
   c) 0.5 to 0.75 moles of hexamethylene diisocyanate, III) reacting the resulting mixture with
   d) 0.1 to 0.65 moles of an alcohol component containing acryloyl groups and comprising one or more monohydric alcohols containing acryloyl groups and having a molecular weight of 116 to 144 and
   e) 0.15 to 0.45 moles of one or more branched monohydric or dihydric alcohols which have a molecular weight of 132 to 2000 and may contain ether and/or ester groups, wherein components d) and e) may be added in any order or in admixture and IV) reacting the product from step III with f) 0.1 to 1.2 moles of one or more at least trihydric alcohols having a molecular weight of 92 to 2000, wherein the NCO:OH equivalent ratio, based on all of the starting components a) to f), is 0.7:1 to 1:1.

2. The process of claim 1 wherein component a) is used in a quantity of 0.3 to 0.4 moles, component b) is used in a quantity of 0.25 to 0.5 moles, component c) is used in a quantity of 0.6 to 0.7 moles, component d) is used in a quantity of 0.2 to 0.6 moles, component e) is used in a quantity of 0.2 to 0.4 moles and component f) is used in a quantity of 0.2 to 1.1 moles.

3. A polyurethane containing acryloyl groups which is prepared by a process which comprises I) reacting at an NCO:OH equivalent ratio of 1.8:1 to 2.5:1, based on starting components a) and b), a) 0.25 to 0.5 moles of a diisocyanate component comprising one or more organic diisocyanates other than hexamethylene diisocyanate which have a molecular weight below 300 and contain aliphatically and/or cycloaliphatically bound isocyanate groups with b) 0.2 to 0.55 moles of an alcohol component containing acryloyl groups and comprising one or more monohydric alcohols containing acryloyl groups and having a molecular weight of 116 to 144

II) mixing the product of step I) with c) 0.5 to 0.75 moles of hexamethylene diisocyanate, III) reacting the resulting mixture with d) 0.1 to 0.65 moles of an alcohol component containing acryloyl groups and comprising one or more monohydric alcohols containing acryloyl groups and having a molecular weight of 116 to 144 and e) 0.15 to 0.45 moles of one or more branched monohydric or dihydric alcohols which have a molecular weight of 132 to 2000 and may contain ether and/or ester groups, wherein components d) and e) may be added in any order or in admixture and IV) reacting the product from step III with f) 0.1 to 1.2 moles of one or more at least trihydric alcohols having a molecular weight of 92 to 2000, wherein the NCO:OH equivalent ratio, based on all of the starting components a) to f), is 0.7:1 to 1:1.

4. The polyurethane of claim 3 wherein component a) is used in a quantity of 0.3 to 0.4 moles, component b) is used in a quantity of 0.25 to 0.5 moles, component c) is used in a quantity of 0.6 to 0.7 moles, component d) is used in a quantity of 0.2 to 0.6 moles, component e) is used in a quantity of 0.2 to 0.4 moles and component f) is used in a quantity of 0.2 to 1.1 moles.

* * * * *